(12) United States Patent
Lee

(10) Patent No.: US 12,537,271 B2
(45) Date of Patent: Jan. 27, 2026

(54) SECONDARY BATTERY

(71) Applicant: Samsung SDI Co., Ltd., Yongin-si (KR)

(72) Inventor: Hyun Soo Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 677 days.

(21) Appl. No.: 17/892,742

(22) Filed: Aug. 22, 2022

(65) Prior Publication Data

US 2023/0178863 A1 Jun. 8, 2023

(30) Foreign Application Priority Data

Dec. 7, 2021 (KR) .......................... 10-2021-0173802

(51) Int. Cl.
*H01M 50/572* (2021.01)
*H01M 50/147* (2021.01)
*H01M 50/188* (2021.01)
*H01M 50/543* (2021.01)

(52) U.S. Cl.
CPC ....... *H01M 50/572* (2021.01); *H01M 50/147* (2021.01); *H01M 50/188* (2021.01); *H01M 50/543* (2021.01)

(58) Field of Classification Search
CPC ............. H01M 50/572; H01M 50/543; H01M 50/188; H01M 50/147
USPC ........................................................ 429/181
See application file for complete search history.

(56) References Cited

U.S. PATENT DOCUMENTS

| 9,478,774 | B2 | 10/2016 | Byun et al. |
| 9,692,034 | B2 | 6/2017 | Lee et al. |
| 10,553,837 | B2 | 2/2020 | Yang et al. |
| 2012/0141845 | A1 | 6/2012 | Byun et al. |

(Continued)

FOREIGN PATENT DOCUMENTS

| JP | 6529566 B2 | 6/2019 |
| KR | 10-1244738 B1 | 3/2013 |
| WO | 2018/056628 A1 | 3/2018 |

OTHER PUBLICATIONS

EPO Extended European Search Report dated May 3, 2023, issued in corresponding European Patent Application No. 22199950.1 (9 pages).

*Primary Examiner* — James M Erwin
(74) *Attorney, Agent, or Firm* — Womble Bond Dickinson (US) LLP

(57) ABSTRACT

A secondary battery includes: an electrode assembly including a first electrode plate, a second electrode plate, and a separator; a case having an opened upper end; a cap plate to seal the upper end of the case; a first electrode terminal on the cap plate, and electrically connected to the first electrode plate; an insulating member between the cap plate and the first electrode terminal; a second electrode terminal on the cap plate, and electrically connected to the second electrode plate; and an electrical connection member between the cap plate and the second electrode terminal to allow electrical conduction between the cap plate and the second electrode terminal, the electrical connection member being in local contact with at least one of the cap plate or the second electrode terminal, and including a material having a higher resistance than those of the cap plate and the second electrode terminal.

20 Claims, 2 Drawing Sheets

(56) References Cited

U.S. PATENT DOCUMENTS

2014/0377638 A1\* 12/2014 Kwak ................. H01M 50/583
　　　　　　　　　　　　　　　　　　　　　429/178
2017/0040579 A1\* 2/2017 Guen .................. H01M 50/578
2018/0138465 A1 5/2018 Yang et al.

\* cited by examiner

SECONDARY BATTERY

CROSS-REFERENCE TO RELATED APPLICATION

This application claims priority to and the benefit of Korean Patent Application No. 10-2021-0173802, filed on Dec. 7, 2021 in the Korean Intellectual Property Office, the entire content of which is incorporated by reference herein.

BACKGROUND

1. Field

Aspects of embodiments of the present disclosure relate to a secondary battery.

2. Description of the Related Art

Unlike a primary battery that cannot be charged, a secondary battery is a rechargeable and dischargeable battery. A low-capacity secondary battery including one single cell packaged in the form of a pack may be used for various suitable portable and small-sized electronic devices, such as cellular phones or camcorders. A high-capacity secondary battery including several tens of cells connected in a battery pack is widely used as a power source for motor drives, such as those used in hybrid vehicles or electric vehicles. Such secondary batteries may be classified into a cylindrical battery, a prismatic battery, a pouch-type (or polymer-type) battery, and the like, according to their external appearance. For example, the prismatic battery may be formed by incorporating an electrode assembly formed with a separator interposed between a positive electrode plate and a negative electrode plate, an electrolyte, and the like into a can, and installing a cap plate in the can.

The above information disclosed in this Background section is for enhancement of understanding of the background of the present disclosure, and therefore, it may contain information that does not constitute prior art.

SUMMARY

One or more embodiments of the present disclosure are directed to a secondary battery capable of constantly implementing quality during manufacturing and assembling.

According to one or more embodiments of the present disclosure, a secondary battery includes: an electrode assembly including a first electrode plate, a second electrode plate, and a separator; a case to accommodate the electrode assembly, the case having an opened upper end; a cap plate to seal the upper end of the case; a first electrode terminal on the cap plate, and electrically connected to the first electrode plate; an insulating member between the cap plate and the first electrode terminal; a second electrode terminal on the cap plate, and electrically connected to the second electrode plate; and an electrical connection member between the cap plate and the second electrode terminal to allow electrical conduction between the cap plate and the second electrode terminal, the electrical connection member being in local contact with at least one of the cap plate or the second electrode terminal, and including a material having a higher resistance than those of the cap plate and the second electrode terminal.

In an embodiment, the second electrode terminal may include: a second terminal plate; and a second terminal pillar extending through the cap plate, and having an upper end coupled to the second terminal plate; and the electrical connection member may include: a body part between the cap plate and the second terminal plate; and an upper protrusion part locally protruding from an upper surface of the body part to locally contact a lower surface of the second terminal plate.

In an embodiment, the second terminal pillar may be coupled to the second terminal plate in a rivet manner; the body part may have a hole through which the second terminal pillar extends; and the upper protrusion part may be located adjacent to the hole.

In an embodiment, a portion of the upper protrusion part in contact with the lower surface of the second terminal plate may have a higher roughness than other portions.

In an embodiment, the second electrode terminal may include: a second terminal plate; and a second terminal pillar extending through the cap plate, and having an upper end coupled to the second terminal plate; and the electrical connection member may include: a body part between the cap plate and the second terminal plate; and a lower protrusion part locally protruding from a lower surface of the body part to locally contact an upper surface of the cap plate.

In an embodiment, the second terminal pillar may be coupled to the second terminal plate in a rivet manner; the body part may have a hole through which the second terminal pillar extends; and the lower protrusion part may be located adjacent to the hole.

In an embodiment, a portion of the lower protrusion part in contact with the upper surface of the cap plate may have a higher roughness than other portions.

In an embodiment, the second electrode terminal may include: a second terminal plate; and a second terminal pillar extending through the cap plate, and having an upper end coupled to the second terminal plate; and the electrical connection member may include: a body part between the cap plate and the second terminal plate; an upper protrusion part locally protruding from an upper surface of the body part to locally contact a lower surface of the second terminal plate; and a lower protrusion part locally protruding from a lower surface of the body part to locally contact an upper surface of the cap plate.

In an embodiment, the second terminal pillar may be coupled to the second terminal plate in a rivet manner; the body part may have a hole through which the second terminal pillar extends; and the upper protrusion part and the lower protrusion part may be located adjacent to the hole.

In an embodiment, a portion of the upper protrusion part in contact with the lower surface of the second terminal plate and a portion of the lower protrusion part in contact with the upper surface of the cap plate may have a higher roughness than other portions.

BRIEF DESCRIPTION OF DRAWINGS

The above and other aspects and features of the present disclosure will be more clearly understood from the following detailed description of the illustrative, non-limiting embodiments with reference to the accompanying drawings.

DETAILED DESCRIPTION

Figure 1:
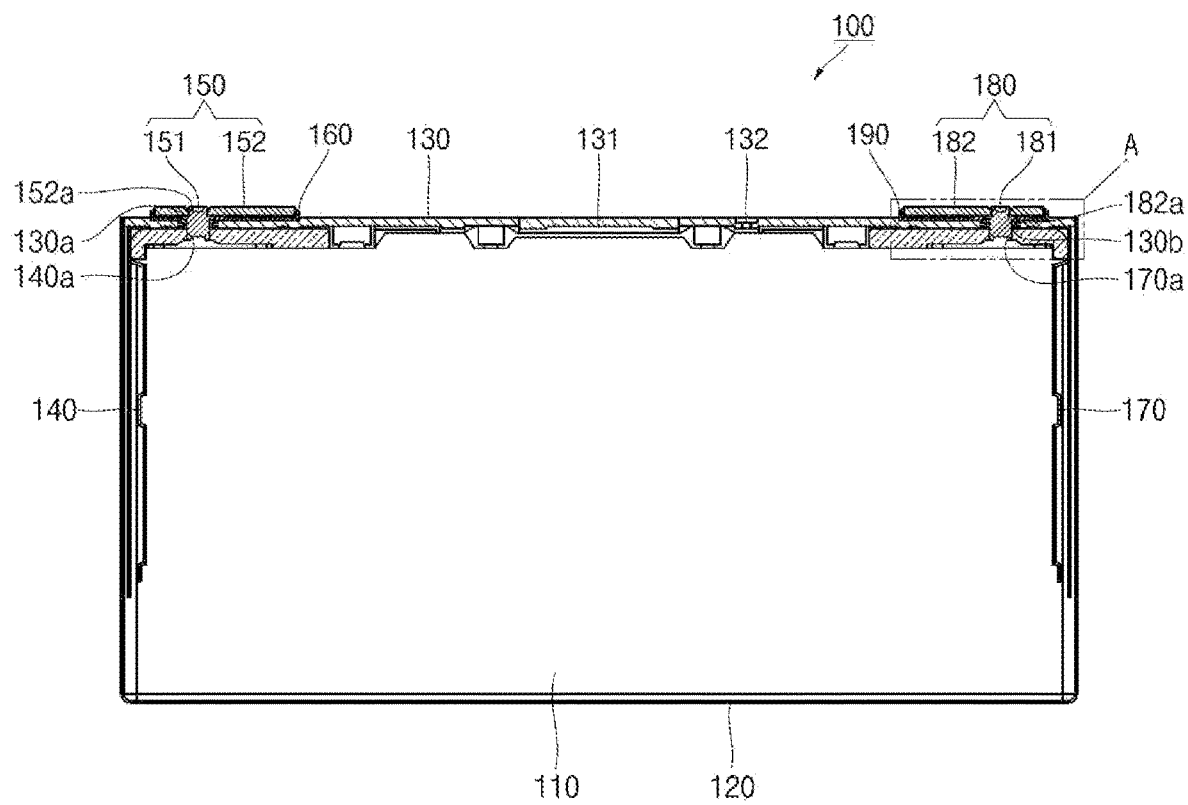
FIG. 1 is a cross-sectional view of a secondary battery according to an embodiment of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
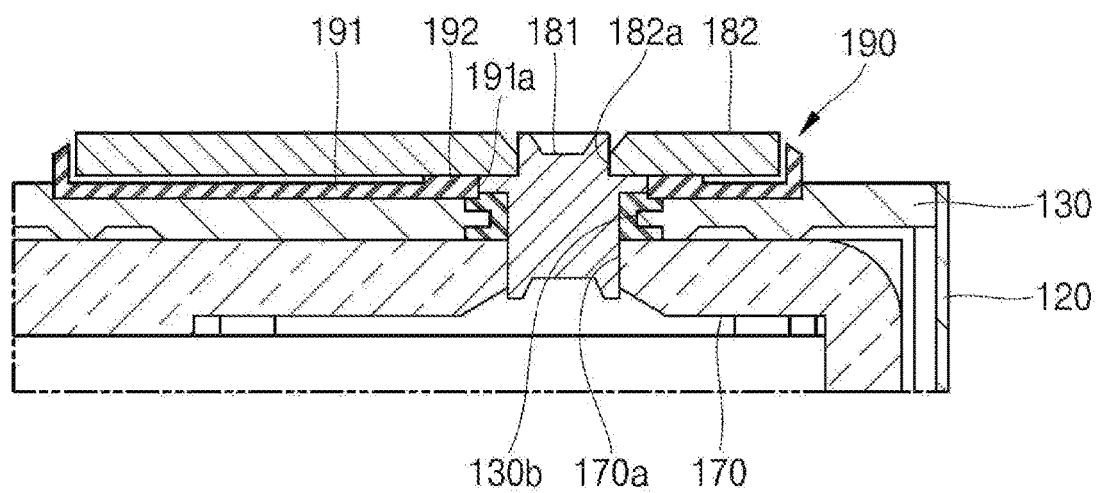
FIG. 2 is an enlarged view of the portion A in FIG. 1.

FIG. 1 is a cross-sectional view of a secondary battery 100 according to an embodiment of the present disclosure, and FIG. 2 is an enlarged view of the portion A in FIG. 1.

Referring to FIG. 1, the secondary battery 100 according to an embodiment of the present disclosure includes an electrode assembly 110, a case 120, a cap plate 130, a first electrode current collector 140, a first electrode terminal 150, an insulating member 160, a second electrode current collector 170, a second electrode terminal 180, and an electrical connection member 190.

The electrode assembly 110 includes a first electrode plate, a second electrode plate, and a separator.

The first electrode plate may be any one of a negative electrode plate and a positive electrode plate. Hereinafter, for convenience, the first electrode plate will be described in more detail as a negative electrode plate as an example. In this case, the first electrode plate includes a negative electrode current collector made of, for example, copper or nickel foil. The negative electrode current collector may have a negative electrode coating portion that is coated with a negative electrode active material made of, for example, carbon or graphite, and a negative electrode uncoated portion that is not coated with a negative electrode active material. In FIG. 1, it is shown by way of example that the negative electrode uncoated portion is aligned on the left side of the electrode assembly 110.

The second electrode plate may be the other one of the negative electrode plate and the positive electrode plate. As described above, when the first electrode plate is the negative electrode plate, the second electrode plate may be the positive electrode plate. In this case, the second electrode plate includes a positive electrode current collector made of, for example, aluminum foil. The positive electrode current collector may have a positive electrode coating portion that is coated with a positive electrode active material made of, for example, a transition metal oxide, and a positive electrode uncoated portion that is not coated with a positive electrode active material. In FIG. 1, it is shown by way of example that the positive electrode uncoated portion is aligned on the right side of the electrode assembly 110.

The separator may be made of, for example, polyethylene, polypropylene, or a composite film of polyethylene and polypropylene, as an insulator. In addition, the separator is interposed between the first electrode plate and the second electrode plate, and serves to prevent or substantially prevent a short circuit between the first electrode plate and the second electrode plate, while allowing, for example, movement of lithium ions.

The electrode assembly 110 may be configured by stacking a plurality of first electrode plates, separators, second electrode plates, separators, and the like in order (e.g., a so-called stack type), or may be configured by being wound around one axis (e.g., a so-called jelly roll type).

The case 120 is formed as a rectangular parallelepiped to have an inner space, and one surface thereof may be opened. In the figures, it is shown by way of example that the upper surface of the case 120 is open. Therefore, the case 120 can accommodate the electrode assembly 110, an electrolyte, and the like, through the upper surface.

The electrolyte may include, for example, an organic solvent, such as ethylene carbonate (EC), propylene carbonate (PC), diethyl carbonate (DEC), dimethyl carbonate (DMC), ethyl methyl carbonate (EMC), and/or a lithium salt, such as $LiPF_6$ or $LibF_4$.

The cap plate 130 is coupled to (e.g., connected to or attached to) the upper end of the case 120, and serves to seal the upper end (e.g., the upper surface) of the case 120. In addition, the cap plate 130 may include a safety vent 131, an electrolyte inlet 132, and the like.

The safety vent 131 is automatically ruptured by a pressure generated when gas is generated inside the case 120, to release the gas and pressure, thereby preventing or substantially preventing an explosion. For example, the safety vent 131 may be formed with a notch to induce an incision.

The electrolyte inlet 132 is for injecting an electrolyte into the inside of the case 120 after the cap plate 130 is installed, and is closed by a separate plug member after the electrolyte is injected.

The first electrode current collector 140 serves to electrically connect the first electrode plate of the electrode assembly 110 and the first electrode terminal 150 to each other. The first electrode current collector 140 may be formed in an inversed (e.g., vertically flipped) L shape (e.g., a '⌐' shape) as a whole. A lower part of the first electrode current collector 140 may be welded to the uncoated portion of the first electrode plate, and an upper part thereof may be coupled to (e.g., connected to or attached to) the first electrode terminal 150. A method for coupling the upper portion to the first electrode terminal 150 will be described in more detail below.

The first electrode terminal 150 is installed on the cap plate 130, and is coupled to (e.g., connected to or attached to) the first electrode current collector 140. The first electrode terminal 150 may include a first terminal pillar 151 and a first terminal plate 152. The first terminal pillar 151 is disposed through a hole 130a of the cap plate 130. In addition, an upper end of the first terminal pillar 151 is inserted, so as to protrude above a hole 152a of the first terminal plate 152, and then an end thereof is deformed, so as to be spread outward in the radial direction, thereby being fastened (e.g., rivet-coupled) to the first electrode current collector 140. Similarly, a lower end of the first terminal pillar 151 is inserted, so as to protrude under (e.g., underneath) a hole 140a of the first electrode current collector 140, and then an end thereof is deformed to spread outward in the radial direction, thereby being fastened (e.g., riveted) to the first electrode current collector 140.

The insulating member 160 is disposed between the cap plate 130 and the first electrode terminal 150, to insulate the cap plate 130 and the first electrode terminal 150 from each other. For assembling performance, the insulating member 160 may be divided into a plurality of elements, for example, such as a portion disposed between the upper surface of the cap plate 130 and the lower surface of the first terminal plate 152, a portion disposed between the hole 130a of the cap plate 130 and the outer circumferential surface of the first terminal pillar 151, and a portion disposed between the lower surface of the cap plate 130 and the upper surface of the first electrode current collector 140.

The second electrode current collector 170 serves to electrically connect the second electrode plate of the electrode assembly 110 and the second electrode terminal 180 to each other. The second electrode current collector 170 may be formed in a rotated (e.g., vertically rotated) L shape (e.g., a '⌐' shape) as a whole. A lower portion of the second electrode current collector 170 may be welded to the uncoated portion of the second electrode plate, and an upper portion thereof may be coupled to (e.g., connected to or attached to) the second electrode terminal 180. A method in which the upper portion is coupled to the second electrode terminal 180 will be described in more detail below.

The second electrode terminal 180 is installed on the cap plate 130, and is coupled to (e.g., connected to or attached to) the second electrode current collector 170. The second electrode current collector 170 may include a second terminal pillar 181 and a second terminal plate 182. The second terminal pillar 181 is disposed through a hole 130b of the cap plate 130. In addition, an upper end of the second terminal pillar 181 is inserted so as to protrude above a hole 182a of the second terminal plate 182, and then an end thereof is deformed, so as to be spread outward in the radial direction, thereby being fastened (e.g., rivet-coupled) to the second electrode current collector 170. Similarly, a lower end of the second terminal pillar 181 is inserted, so as to protrude under (e.g., underneath) a hole 170a of the second electrode current collector 170, and then an end thereof is deformed to spread outward in the radial direction, thereby being fastened (e.g., riveted) to the second terminal plate 182.

The electrical connection member 190 is disposed between the cap plate 130 and the second electrode terminal 180, to allow electrical conduction therebetween. The electrical connection member 190 is made of a material having a higher resistance than that of the cap plate 130 or the second electrode terminal 180. For example, when the cap plate 130 is made of aluminum, the electrical connection member 190 may be made of stainless steel, a nickel steel alloy, Invar, or the like. The electrical connection member 190 includes a body part 191 and an upper protrusion part 192 (e.g., see FIG. 2).

The body part 191 is disposed between the cap plate 130 and the second terminal plate 182. In addition, the body part 191 has a hole 191a, so that the second terminal pillar 181 may be disposed through the hole 191a.

The upper protrusion part 192 protrudes upward from an upper surface of the body part 191 toward a lower surface of the second terminal plate 182, and contacts (e.g., comes into contact with) the lower surface of the second terminal plate 182. However, the upper protrusion part 192 may not extend from the upper surface of the body part 191 over an entire area of the body part 191, but may locally protrude from a partial area thereof. The upper protrusion part 192 is not in contact with the lower surface of the second terminal plate 182 over an entire area of the second terminal plate 182, but is locally in contact with a partial area thereof. When the second electrode terminal 180 and the electrical connection member 190 are in contact with each other over a large area, it may be difficult to constantly (e.g., consistently) provide conduction characteristics due to contact area distribution by tolerances during manufacturing and assembling. However, according to the present embodiment, because the second electrode terminal 180 and the electrical connection member 190 are in contact with each other over a relatively narrow area, the contact area distribution may be correspondingly reduced, thereby constantly (e.g., consistently) providing conduction characteristics.

Furthermore, the upper protrusion part 192 is disposed to be adjacent to the hole 191a of the body part 191. In general, as described above, when the second electrode terminal 180 is installed in a rivet manner, a greater load may be applied to the periphery of the hole 191a in the body part 191. Therefore, according to the above configuration, because the upper protrusion part 192 is disposed around the hole 191a that receives a large load from the body part 191, the second electrode terminal 180 and the electrical connection member 190 may be in closer contact with each other when the second electrode terminal 180 is installed in a rivet manner.

A portion of the upper protrusion part 192 that is in contact with the lower surface of the second terminal plate 182 (e.g., the upper surface of the upper protrusion part 192) has a higher roughness than other portions, for example, such as a lateral side of the upper protrusion part 192 or a surface of the body part 191. Accordingly, the second electrode terminal 180 and the electrical connection member 190 may be in more stable contact with each other.

Figure 3:
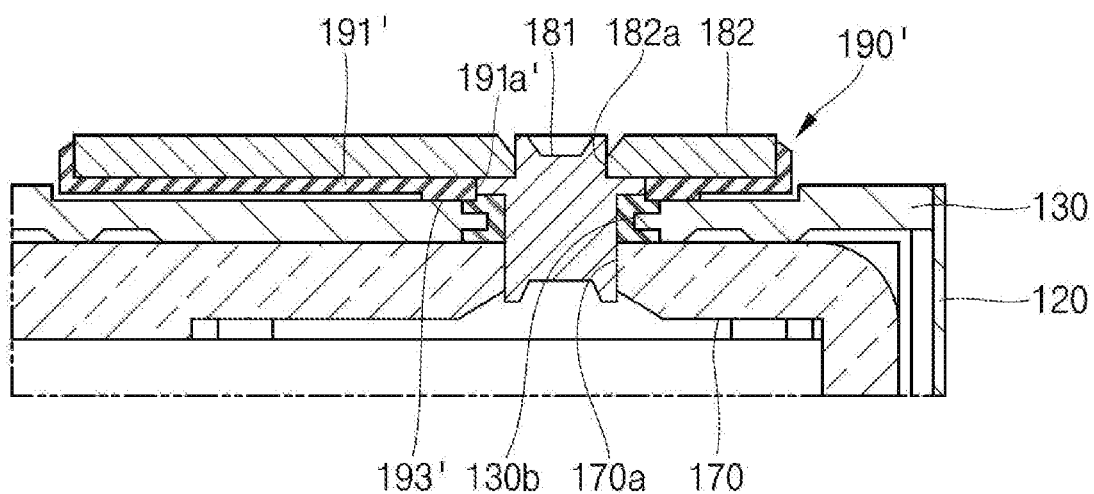
FIG. 3 shows a secondary battery according to another embodiment of the present disclosure, illustrating a portion thereof corresponding to FIG. 2.

FIG. 3 shows a secondary battery according to another embodiment of the present disclosure, illustrating a portion thereof corresponding to FIG. 2.

The secondary battery according to another embodiment of the present disclosure includes an electrode assembly 110, a case 120, a cap plate 130, a first electrode current collector 140, a first electrode terminal 150, an insulating member 160, a second electrode current collector 170, a second electrode terminal 180, and an electrical connection member 190'.

Because the electrode assembly 110, the case 120, the cap plate 130, the first electrode current collector 140, the first electrode terminal 150, the insulating member 160, the second electrode current collector 170, and the second electrode terminal 180 of the secondary battery according to the embodiment shown in FIG. 3 may be the same or substantially the same as the electrode assembly 110, the case 120, the cap plate 130, the first electrode current collector 140, the first electrode terminal 150, the insulating member 160, the second electrode current collector 170, and the second electrode terminal 180 of the secondary battery 100 according to one or more embodiments of the present disclosure described above, the same reference numerals are used to denote the same or substantially the same elements and components, and thus, redundant description thereof may not be repeated.

Accordingly, the electrical connection member 190' will be described in more detail hereinafter with reference to FIG. 3, and redundant description may not be repeated.

Referring to FIG. 3, the electrical connection member 190' is disposed between the cap plate 130 and the second electrode terminal 180, to allow electrical conduction therebetween. The electrical connection member 190' is made of a material having a higher resistance than that of the cap plate 130 or the second electrode terminal 180. For example, when the cap plate 130 is made of aluminum, the electrical connection member 190' may be made of stainless steel, a nickel steel alloy, Invar, or the like. The electrical connection member 190' includes a body part 191' and a lower protrusion part 193'.

The body part 191' is disposed between the cap plate 130 and the second terminal plate 182. The body part 191' has a hole 191a' formed therein to allow the second terminal pillar 181 to be disposed through the hole 191a'.

The lower protrusion part 193' protrudes downward from a lower surface of the body part 191' toward an upper surface of the cap plate 130 to be in contact with the upper surface of the cap plate 130. However, the lower protrusion part 193' does not extend from the lower surface of the body part 191' over an entire area of the body part 191', but may locally protrude from a partial area thereof. When the cap plate 130 and the electrical connection member 190' are in contact with each other over a large area, it may be difficult to constantly (e.g., consistently) provide the performance and quality of the secondary battery due to contact area distribution by a tolerance during manufacturing. However, according to the present embodiment, because the cap plate 130 and the electrical connection member 190' are in contact with each other over a relatively narrow area, the contact area distribution is correspondingly reduced, and thus, the performance and quality of the secondary battery may be constantly (e.g., consistently) provided.

Further, the lower protrusion part 193' is disposed to be adjacent to the hole 191a' of the body part 191'. In general, as described above, when the second electrode terminal 180 is installed in a rivet manner, a greater load is applied to the periphery of the hole 191a' in the body part 191'. Therefore, according to the above configuration, the lower protrusion part 193' is disposed around the hole 191a' that receives a large load from the body part 191', and thus, the cap plate 130 and the electrical connection member 190' may be in closer contact with each other when the second electrode terminal 180 is installed in a rivet manner.

A portion of the lower protrusion part 193' that is in contact with the upper surface of the cap plate 130 (e.g., the lower surface of the lower protrusion part 193') has a higher roughness than other portions, for example, such as a lateral side of the lower protrusion part 193' or a surface of the body part 191'. Accordingly, the second electrode terminal 180 and the electrical connection member 190' may be in more stable contact with each other.

Figure 4:
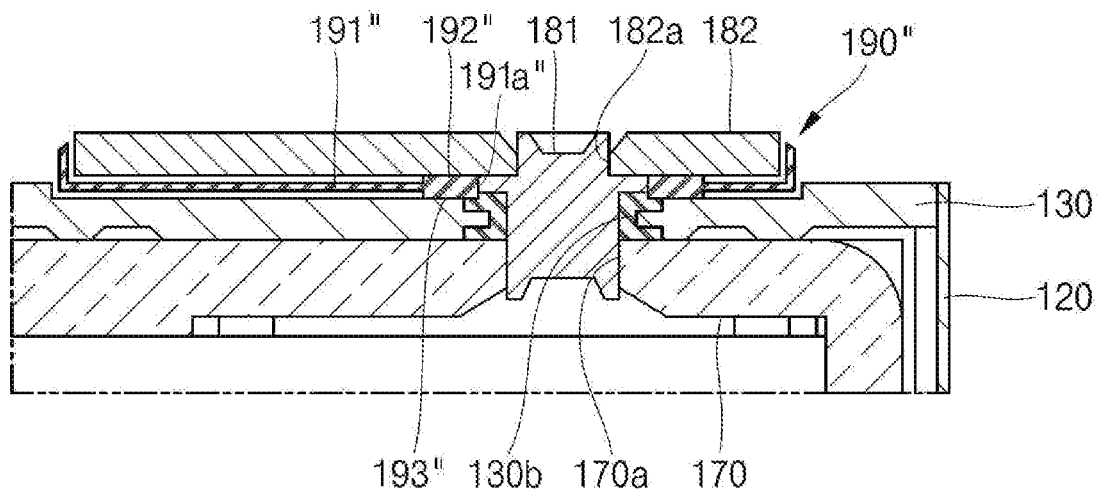
FIG. 4 shows a secondary battery according to another embodiment of the present disclosure, illustrating a portion thereof corresponding to FIG. 2.

FIG. 4 shows a secondary battery according to another embodiment of the present disclosure, illustrating a portion thereof corresponding to FIG. 2.

The secondary battery according to another embodiment of the present disclosure includes an electrode assembly 110, a case 120, a cap plate 130, a first electrode current collector 140, a first electrode terminal 150, an insulating member 160, a second electrode current collector 170, a second electrode terminal 180, and an electrical connection member 190".

Because the electrode assembly 110, the case 120, the cap plate 130, the first electrode current collector 140, the first electrode terminal 150, the insulating member 160, the second electrode current collector 170, and the second electrode terminal 180 of the secondary battery according to the embodiment shown in FIG. 4 may be the same or substantially the same as the electrode assembly 110, the case 120, the cap plate 130, the first electrode current collector 140, the first electrode terminal 150, the insulating member 160, the second electrode current collector 170, and the second electrode terminal 180 of the secondary battery 100 according to one or more embodiments of the present disclosure described above, the same reference numerals are used to denote the same or substantially the same elements and components, and thus, redundant description thereof may not be repeated.

Accordingly, the electrical connection member 190" will be described in more detail hereinafter with reference to FIG. 4, and redundant description may not be repeated.

Referring to FIG. 4, the electrical connection member 190" is disposed between the cap plate 130 and the second electrode terminal 180, to allow electrical conduction therebetween. The electrical connection member 190" is made of a material having a higher resistance than those of the cap plate 130 and the second electrode terminal 180. For example, when the cap plate 130 is made of aluminum, the electrical connection member 190" may be made of stainless steel, a nickel steel alloy, Invar, or the like. The electrical connection member 190" includes a body part 191", an upper protrusion part 192", and a lower protrusion part 193".

The body part 191" is disposed between the cap plate 130 and the second terminal plate 182. In addition, the body part 191" has a hole 191a" formed therein to allow the second terminal pillar 181 to be disposed through the hole 191a".

The upper protrusion part 192" protrudes upward from an upper surface of the body part 191" toward a lower surface of the second terminal plate 182 to be in contact with the lower surface of the second terminal plate 182. However, the upper protrusion part 192" does not extend from the upper surface of the body part 191" over an entire area of the body part 191", but may locally protrude from a partial area thereof. The upper protrusion part 192" is disposed adjacent to the hole 191a" of the body part 191". A portion of the upper protrusion part 192" that is in contact with the lower surface of the second terminal plate 182 (e.g., the upper surface of the upper protrusion part 192") has a higher roughness than other portions, for example, such as a lateral side of the upper protrusion part 192" or a surface of the body part 191". The benefits according to these characteristics are the same as those described above with reference to the secondary battery 100 according to one or more embodiments of the present disclosure, and thus, redundant description thereof is not repeated.

The lower protrusion part 193" protrudes downward from a lower surface of the body part 191" toward the upper surface of the cap plate 130 to be in contact with the upper surface of the cap plate 130. However, the lower protrusion part 193" does not extend from the lower surface of the body part 191" over the entire area of the body part 191", but may locally protrude from a partial area thereof. Furthermore, the lower protrusion part 193" is disposed adjacent to the hole 191a" of the body part 191". A portion of the lower protrusion part 193" that is in contact with the upper surface of the cap plate 130 (e.g., the lower surface of the lower protrusion part 193") has a higher roughness than other portions, for example, such as a lateral side of the lower protrusion part 193" or the surface of the body part 191". The benefits according to these characteristics are the same as those described above with reference to the secondary battery according to one or more embodiments of the present disclosure, and thus, redundant description thereof is not repeated.

As described above, according to one or more embodiments of the present disclosure, the electrical connection member is disposed between the cap plate and the second electrode terminal (e.g., the positive terminal) to allow electrical conduction therebetween, and may locally be in contact with the cap plate and/or the second electrode terminal, thereby being in contact over a relatively narrow area. Accordingly, the contact area distribution is correspondingly reduced, and thus, the performance and quality of the secondary battery may be constantly (e.g., consistently) provided during manufacturing and assembling.

Furthermore, the electrical connection member may be designed to be locally in contact at an area that receives the greatest load when the second electrode terminal is installed in a rivet manner, thereby making closer contact.

Furthermore, because the contact area of the electrical connection member may be designed to have a higher roughness than other portions, more stable contact may be provided.

Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A secondary battery comprising:
   an electrode assembly comprising a first electrode plate, a second electrode plate, and a separator;
   a case to accommodate the electrode assembly, the case having an opened upper end;
   a cap plate to seal the opened upper end of the case;

a first electrode terminal on the cap plate, and electrically connected to the first electrode plate;
an insulating member between the cap plate and the first electrode terminal;
a second electrode terminal on the cap plate, and electrically connected to the second electrode plate; and
an electrical connection member between the cap plate and the second electrode terminal to allow electrical conduction between the cap plate and the second electrode terminal, the electrical connection member being in local contact with at least one of the cap plate or the second electrode terminal, and comprising a material having a higher resistance than those of the cap plate and the second electrode terminal,
wherein the electrical connection member comprises:
a body part between the cap plate and the second electrode terminal; and
at least one protrusion part locally protruding from at least one surface of the body part to locally contact the at least one of the cap plate or the second electrode terminal, a portion of the at least one protrusion part in contact with the at least one of the cap plate or the second electrode terminal having a higher roughness than other portions.

2. The secondary battery of claim 1, wherein:
the second electrode terminal comprises:
a second terminal plate; and
a second terminal pillar extending through the cap plate, and having an upper end coupled to the second terminal plate; and
the electrical connection member comprises:
an upper protrusion part, as the at least one protrusion part, locally protruding from an upper surface of the body part to locally contact a lower surface of the second terminal plate.

3. The secondary battery of claim 2, wherein:
the second terminal pillar is coupled to the second terminal plate in a rivet manner;
the body part has a hole through which the second terminal pillar extends; and
the upper protrusion part is located adjacent to the hole.

4. The secondary battery of claim 2, wherein a portion of the upper protrusion part, as the portion of the at least one protrusion part, in contact with the lower surface of the second terminal plate has the higher roughness than the other portions.

5. The secondary battery of claim 1, wherein:
the second electrode terminal comprises:
a second terminal plate; and
a second terminal pillar extending through the cap plate, and having an upper end coupled to the second terminal plate; and
the electrical connection member comprises:
a lower protrusion part, as the at least one protrusion part, locally protruding from a lower surface of the body part to locally contact an upper surface of the cap plate.

6. The secondary battery of claim 5, wherein:
the second terminal pillar is coupled to the second terminal plate in a rivet manner;
the body part has a hole through which the second terminal pillar extends; and
the lower protrusion part is located adjacent to the hole.

7. The secondary battery of claim 5, wherein a portion of the lower protrusion part, as the portion of the at least one protrusion part, in contact with the upper surface of the cap plate has the higher roughness than the other portions.

8. The secondary battery of claim 1, wherein:
the second electrode terminal comprises:
a second terminal plate; and
a second terminal pillar extending through the cap plate, and having an upper end coupled to the second terminal plate; and
the at least one protrusion part of the electrical connection member comprises:
an upper protrusion part locally protruding from an upper surface of the body part to locally contact a lower surface of the second terminal plate; and
a lower protrusion part locally protruding from a lower surface of the body part to locally contact an upper surface of the cap plate.

9. The secondary battery of claim 8, wherein:
the second terminal pillar is coupled to the second terminal plate in a rivet manner;
the body part has a hole through which the second terminal pillar extends; and
the upper protrusion part and the lower protrusion part are located adjacent to the hole.

10. The secondary battery of claim 8, wherein the portion of the at least one protrusion part comprises:
a first portion of the upper protrusion part in contact with the lower surface of the second terminal plate; and
a second portion of the lower protrusion part in contact with the upper surface of the cap plate, and
wherein the first and second portions have the higher roughness than the other portions.

11. A secondary battery comprising:
an electrode assembly comprising a first electrode plate, a second electrode plate, and a separator;
a case to accommodate the electrode assembly, the case having an opened upper end;
a cap plate to seal the opened upper end of the case;
a first electrode terminal on the cap plate, and electrically connected to the first electrode plate;
an insulating member between the cap plate and the first electrode terminal;
a second electrode terminal on the cap plate, and electrically connected to the second electrode plate; and
an electrical connection member between the cap plate and the second electrode terminal to allow electrical conduction between the cap plate and the second electrode terminal, and comprising a material having a higher resistance than those of the cap plate and the second electrode terminal,
wherein the electrical connection member comprises:
a body part between the cap plate and the second electrode terminal; and
at least one protrusion part locally protruding from at least one surface of the body part to locally contact at least one of the cap plate or the second electrode terminal, and
wherein a portion of the at least one surface of the body part adjacent to the at least one protrusion part and overlapping with each of the cap plate and the second electrode terminal is spaced from the at least one of the cap plate or the second electrode terminal contacted by the at least one protrusion part.

12. The secondary battery of claim 11, wherein:
the second electrode terminal comprises:
a second terminal plate; and
a second terminal pillar extending through the cap plate, and having an upper end coupled to the second terminal plate; and
the electrical connection member comprises:

an upper protrusion part, as the at least one protrusion part, locally protruding from an upper surface of the body part to locally contact a lower surface of the second terminal plate.

13. The secondary battery of claim 12, wherein:
the second terminal pillar is coupled to the second terminal plate in a rivet manner;
the body part has a hole through which the second terminal pillar extends; and
the upper protrusion part is located adjacent to the hole.

14. The secondary battery of claim 12, wherein a portion of the upper protrusion part in contact with the lower surface of the second terminal plate has a higher roughness than other portions.

15. The secondary battery of claim 11, wherein:
the second electrode terminal comprises:
  a second terminal plate; and
  a second terminal pillar extending through the cap plate, and having an upper end coupled to the second terminal plate; and
the electrical connection member comprises:
  a lower protrusion part, as the at least one protrusion part, locally protruding from a lower surface of the body part to locally contact an upper surface of the cap plate.

16. The secondary battery of claim 15, wherein:
the second terminal pillar is coupled to the second terminal plate in a rivet manner;
the body part has a hole through which the second terminal pillar extends; and
the lower protrusion part is located adjacent to the hole.

17. The secondary battery of claim 15, wherein a portion of the lower protrusion part in contact with the upper surface of the cap plate has a higher roughness than other portions.

18. The secondary battery of claim 11, wherein:
the second electrode terminal comprises:
  a second terminal plate; and
  a second terminal pillar extending through the cap plate, and having an upper end coupled to the second terminal plate; and
the at least one protrusion part of the electrical connection member comprises:
  an upper protrusion part locally protruding from an upper surface of the body part to locally contact a lower surface of the second terminal plate; and
  a lower protrusion part locally protruding from a lower surface of the body part to locally contact an upper surface of the cap plate.

19. The secondary battery of claim 18, wherein:
the second terminal pillar is coupled to the second terminal plate in a rivet manner;
the body part has a hole through which the second terminal pillar extends; and
the upper protrusion part and the lower protrusion part are located adjacent to the hole.

20. The secondary battery of claim 8, wherein the at least one protrusion part comprises:
a first portion of the upper protrusion part in contact with the lower surface of the second terminal plate; and
a second portion of the lower protrusion part in contact with the upper surface of the cap plate, and
wherein the first and second portions have a higher roughness than other portions.

* * * * *